Patented Nov. 18, 1930

1,782,382

UNITED STATES PATENT OFFICE

HEINRICH EGGERS, OF BREMEN-WESER, GERMANY, ASSIGNOR OF FIVE PER CENT TO ALEXANDER ORGOVAN AND FIVE PER CENT TO OTTO S. LESZAY, BOTH OF NEW YORK, N. Y., AND FIVE PER CENT TO IRVING MATUSOFF, OF BROOKLYN, NEW YORK

PROCESS FOR THE MANUFACTURE OF PAPER FROM PLANT FIBER

No Drawing. Application filed January 4, 1929, Serial No. 330,413. Renewed October 17, 1930.

This invention relates to a process for the manufacture of paper from plant fiber and like material, and is especially adapted for use with the leaves, stalks, roots, husks, shells, etc., of potatoes, corn, beans, peas, cotton, bananas and all similar fruits and vegetables, and has for its object to provide means for converting material of this nature into paper possessing a high degree of strength and durability, as well as a clean and attractive surface apearance.

A further object is a great reduction in the cost of paper as compared to that produced from other forms of material.

These and other objects and characteristics of the invention will be fully set forth and described in the following specification and claims.

The process is as follows:

The material is first cut into small pieces and washed, and to the mass is added a quantity of paper waste equal to 3 percent of the volume of the said mass. A 2 percent caustic soda solution is then added, and to this is added 1 percent of powdered chalk. The material is then cooked in a closed converter under a pressure of approximately 3 atmospheres for about three hours. The resultant mass is then reduced to small pieces. Aniline colors may now be added in any desired shades. If no coloring matter is used; the product will have a gray appearance.

If white paper is desired; the material may be bleached by the addition of chloride of lime and powdered chalk in proportions in ratio to the weight of the mass as follows: chloride of lime 5 per cent, and powdered chalk 2 per cent.

After adding the foregoing elements; the mass is mixed, or stirred for thirty minutes, a solution of bi-carbonate of soda is then added in greater, or less quantity as the mass is dark, or light in color.

When the foregoing manipulation is completed; the material is worked into suitable sheet formation.

What is claimed is as follows:

1. A process for making paper from the fibrous material of plants, which process consists of subjecting the said material, together with a mixture of waste paper and powdered chalk to the action of a solution of caustic soda in a closed converter and under a greater than atmospheric pressure.

2. A process for making paper from the fibrous material of plants, which process consists of subjecting the said material, together with a mixture of waste paper and powdered chalk to the action of a solution of caustic soda in a closed converter and under a pressure of approximately 3 atmospheres for a period of about three hours, the proportion of caustic soda in the solution being about 2 percent.

3. A process for making paper from the fibrous material of plants, which process consists of subjecting the said material, after cutting up and washing the same and adding a mixture of waste paper and powdered chalk, to the action of a 2 percent solution of caustic soda, and cooking in a closed converter under a pressure of approximately 3 atmospheres for a period of about 3 hours, substantially as herein described.

4. A process for the making of paper from plant fiber of the character described, the said process being as follows: to a quantity of the said material which has been cut up and washed, waste paper equal to 3 percent of the mass and powdered chalk equal in weight to 1 percent thereof are added, the mass is then mixed with a 2 percent solution of caustic soda and cooked in a closed converter under a greater than atmospheric pressure for approximately three hours, the resultant material is then bleached by the addition of a solution of chloride of lime equal to 5 percent of the whole, and powdered chalk equal to 2 percent thereof, these are thoroughly mixed for a period of thirty minutes, after which bi-carbonate of soda is added in a quantity determined by the coloring which it is desired to remove.

Signed at New York in the county of Kings and State of New York Jan. 2, 1929.

HEINRICH EGGERS.